US009977816B1

(12) United States Patent
Jing et al.

(10) Patent No.: US 9,977,816 B1
(45) Date of Patent: *May 22, 2018

(54) LINK-BASED RANKING OF OBJECTS THAT DO NOT INCLUDE EXPLICITLY DEFINED LINKS

(71) Applicant: Google LLC, Mountain View, CA (US)

(72) Inventors: Yushi Jing, Mountain View, CA (US); Henry Allan Rowley, Sunnyvale, CA (US); Shumeet Baluja, Leesburg, VA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/964,697

(22) Filed: Dec. 10, 2015

Related U.S. Application Data

(63) Continuation of application No. 14/279,972, filed on May 16, 2014, now abandoned, which is a continuation of application No. 12/099,503, filed on Apr. 8, 2008, now Pat. No. 8,732,187.

(60) Provisional application No. 60/910,757, filed on Apr. 9, 2007.

(51) Int. Cl.
*G06F 17/30* (2006.01)

(52) U.S. Cl.
CPC .... *G06F 17/3053* (2013.01); *G06F 17/30256* (2013.01); *G06F 17/30554* (2013.01); *G06F 17/30867* (2013.01)

(58) Field of Classification Search
CPC combination set(s) only.
See application file for complete search history.

(56) References Cited

U.S. PATENT DOCUMENTS

| 6,285,999 | B1 | 9/2001 | Page |
| 6,636,220 | B1* | 10/2003 | Szeliski ................ G06T 13/80 345/475 |
| 6,642,929 | B1 | 11/2003 | Essafi et al. |
| 6,850,252 | B1 | 2/2005 | Hoffberg |
| 7,043,474 | B2 | 5/2006 | Mojsilovic et al. |
| 7,170,632 | B1 | 1/2007 | Kinjo |
| 7,773,800 | B2* | 8/2010 | Liu ..................... G06K 9/6253 382/158 |
| 8,090,222 | B1 | 1/2012 | Baluja et al. |
| 8,732,187 | B1 | 5/2014 | Jing et al. |
| 2002/0028021 | A1* | 3/2002 | Foote ................ G06K 9/00758 382/224 |
| 2002/0038299 | A1 | 3/2002 | Zernik et al. |
| 2002/0057343 | A1 | 5/2002 | Ronk et al. |
| 2003/0185450 | A1* | 10/2003 | Garakani ............ G06K 9/0014 382/232 |

(Continued)

OTHER PUBLICATIONS

Brin, Sergey et al., "The Anatomy of a Large-Scale Hypertextual Web Search Engine", 7th International World Wide Conference, Brisbane, Australia, 1998, 20 pages.

(Continued)

*Primary Examiner* — Shyue Jiunn Hwa
(74) *Attorney, Agent, or Firm* — Fish & Richardson P.C.

(57) ABSTRACT

A system determines ranking scores for objects based on "virtual" links defined for the objects. A link-based ranking score may then be calculated for the objects based on the virtual links. In one implementation, the virtual links are determined based on a metric of content-based similarity between the objects.

20 Claims, 10 Drawing Sheets

(56) References Cited

U.S. PATENT DOCUMENTS

| | | | |
|---|---|---|---|
| 2004/0162827 A1 | 8/2004 | Nakano | |
| 2004/0189691 A1 | 9/2004 | Jojic et al. | |
| 2005/0223031 A1* | 10/2005 | Zisserman | G06F 17/30256 |
| 2006/0210157 A1* | 9/2006 | Agnihotri | G06F 17/30793 |
| | | | 382/173 |

OTHER PUBLICATIONS

Lowe, David G., "Distinctive Image Features from Scale-Invariant Keypoints", International Journal of Computer Vision, 60, 2m 2004, pp. 91-110.

Ke, Yan et al., "PCA-SIFT: A More Distinctive Representation for Local Image Descriptors", Proceedings of Computer Vision and Pattern Recognition, 2004, 8 pages.

Gibson, David et al., "Inferring Web Communities from Link Topology", Proc. 9th ACM Conference on Hypertext and Hypermedia, 1998, 10 pages.

Haveliwala, T., "Topic-Sensitive PageRank. A Context-Sensitive Ranking Algorithm for Web Search", IEEE Trans. Knowl. Data Eng., 15(4), 2003, pp. 784-796.

Mikolajczk, Krystian et al., "A Performance Evaluation of Local Descriptors" IEEE Transactions on Pattern Analysis and Machine Intelligence, vol. 27, No. 10, Oct. 2005, pp. 1615-1630.

Lowe, David G., "Local Feature View Clustering for 3D Object Recognition", Proceedings of the IEEE Conference on Computer Vision and Pattern Recognition, Dec. 2001, 7 pages.

Rothganger, Fred et al., "3D Object Modeling and Recognition Using Local Affine-Invariant Image Descriptors and Multi-View Spatial Constraints", Conference on Computer Vision and Pattern Recognition, 2004, 47 pages.

Dalal, Navneet, et al., "Histograms of oriented Gradients for Human Detection", Proceedings of the IEEE Conference on Computer Vision and Pattern Recognition, Jun. 2005, pp. 886-893.

Nister, David et al., "Scalable Recognition with a Vocabulary Tree", Proceedings of IEEE Conference Computer Vision and Pattern Recognition, Jun. 2006, pp. 2161-2168.

Grauman, Kristen et al., "Pyramid Match Kernels: Discriminative Classification with Sets of Image Features", Massachusetts Institute of Technology, Cambridge, MA, Mar. 17, 2005, 13 pages.

Jeh, G. et al., SimRank. A Measure of Structural-Context Similarity, Proceedings of the Eighth ACM SIGKDD International Conference on Knowledge Discovery and Data Mining. New York, NY, USA, ACM, (2002), 11 pages.

* cited by examiner

LINK-BASED RANKING OF OBJECTS THAT DO NOT INCLUDE EXPLICITLY DEFINED LINKS

CROSS REFERENCE TO RELATED APPLICATION

This application is a continuation of U.S. application Ser. No. 14/279,972, filed May 16, 2014, which is a continuation of U.S. application Ser. No. 12/099,503, filed Apr. 8, 2008, now U.S. Pat. No. 8,732,187, which claims the benefit of Provisional Application No. 60/910,757, filed Apr. 9, 2007, the disclosure of which are each incorporated herein by reference

BACKGROUND

The World Wide Web ("web") contains a vast amount of information. Search engines assist users in locating desired portions of this information by cataloging web pages. Typically, in response to a user's request, the search engine returns references to documents relevant to the request.

One type of search engine is an image search engine. An image search engine, such as a web-based image search engine, catalogs images from the web. Typically, the image search engine may associate text, such as text that occurs near a particular image, with the image. The text associated with the images may then be searched using conventional key word-based search queries to locate images relevant for the search.

When a user enters a search query for images in an image search engine, the search engine may return hundreds of results (e.g., images or links to images). The large number of potentially relevant results can be daunting for the user. Additionally, because the relevancy of the results may be primarily determined based on text associated with the image, such as text near the image in a web page, the image itself may not match the search or may be of relatively low quality. For example, a search for "Eiffel Tower" may result in some images that include the Eiffel Tower while others may not. Of the images that contain the Eiffel Tower, some may be images taken at odd poses or odd croppings of the Eiffel Tower, or the Eiffel Tower may not be the main focus of the image (for example, the image may primarily be a picture of a person standing at the base of the Eiffel Tower, with the Eiffel Tower only minimally visible in the background).

It is a goal of an image search engine to return relevant and high quality images to the user.

SUMMARY

One aspect is directed to a method that may include receiving a set of images for which ranking scores are to be calculated and determining transitional probabilities between images in the set of images, the transitional probabilities each being an estimate of a likelihood that a user viewing a first image is likely to select a second image. The method may further include calculating link-based ranking scores that each define a measure of quality for the images, the link-based ranking scores being calculated using the transitional probabilities as links between images in the set of images; and providing the images to users in an order influenced by the calculated link-based ranking scores.

Yet another aspect is directed to a method that may include receiving a set of objects and generating virtual links between pairs of objects in the set of objects. The method may further include calculating a link-based ranking score for a first object in the set of objects based on the generated virtual links and presenting the first object to a user based on the link-based ranking score of the first object.

Yet another aspect is directed to a system that comprises a server connected to a network to receive a search query from a user via the network. The server includes a database to store descriptive text relating to objects and a processor. The processor may generate an initial set of objects relevant to the search query based on a matching of terms in the search query to the descriptive text stored in the database and obtains ranking scores for the objects in the generated set of objects, the ranking scores being based on transitional probabilities that each represent a likelihood that a user having accessed a first object in the set of objects is likely to access a second object in the set of objects. The processor may additionally return a result set of objects or links to the objects to the user, the order of the objects in the result set being determined based on the ranking scores for the objects.

BRIEF DESCRIPTION OF THE DRAWINGS

The accompanying drawings, which are incorporated in and constitute a part of this specification, illustrate one or more embodiments of the invention and, together with the description, explain these embodiments. In the drawings.

DETAILED DESCRIPTION

The following detailed description refers to the accompanying drawings. The detailed description does not limit the invention.

Overview

Implementations described herein relate to assigning ranking scores to objects, such as images. The ranking scores may define an objective measure of quality of the objects and may be calculated based on "virtual links" between different objects. The virtual links do not necessarily need to be explicitly defined by the objects. Instead, the virtual links may be generated using content-based similarity information determined for the objects.

The objects will be particularly described herein as images, although other types of objects, such as audio or video objects, could also be used.

Figure 1:
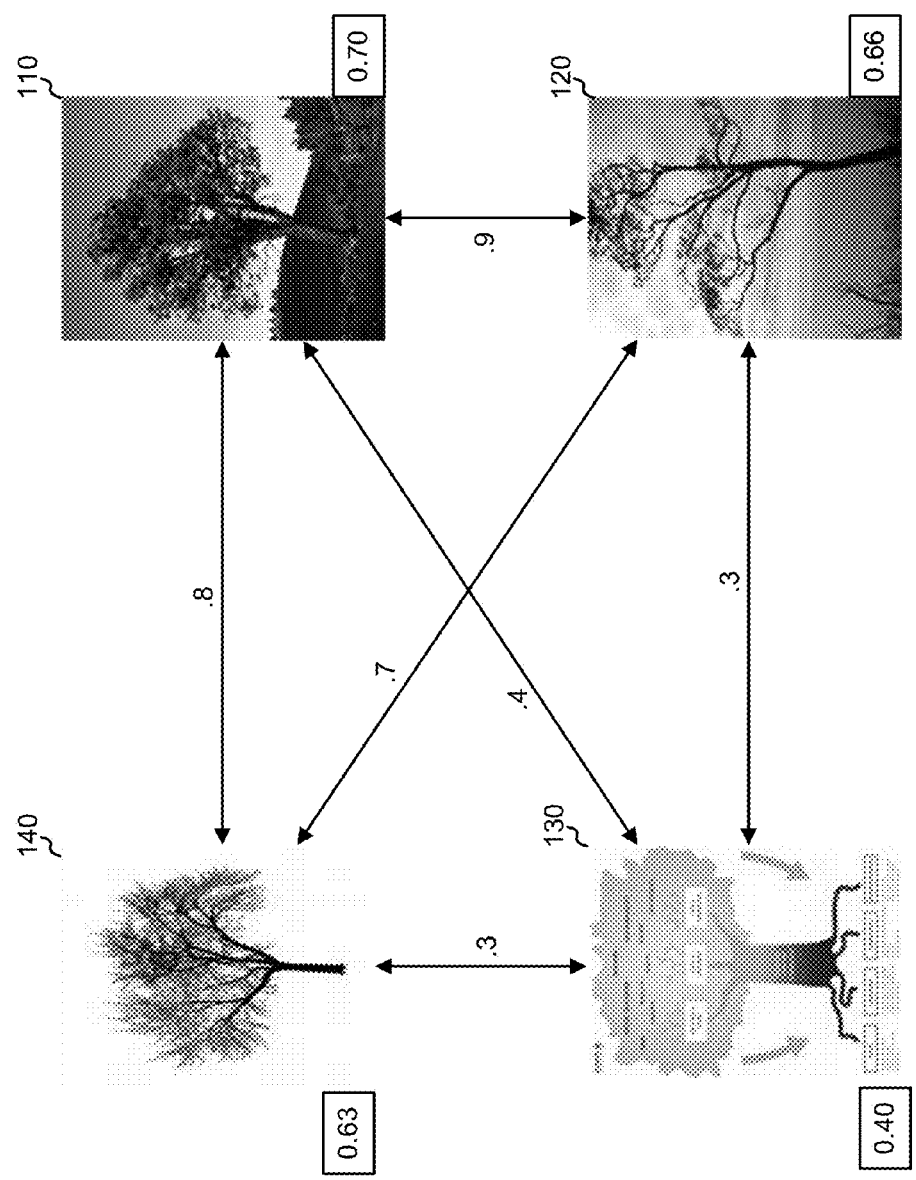
FIG. 1 is a diagram providing a conceptual overview of concepts described herein.

FIG. 1 is a diagram providing a conceptual overview of concepts described herein. In this example, assume that four images of a tree, images 110, 120, 130, and 140 are to be ranked. That is, a ranking score is to be generated for each of the images that defines an objective measurement of quality of the images. Images with higher ranking scores should correspond to higher quality or "better" images.

For each pair of images shown in FIG. 1, a content based similarity metric may be calculated for the pair of images. This similarity metric may be based on features of the images themselves. A number of different possible image features may be used. For example, the feature comparison may be based on intensity or color histograms of the images, edge based features of the images, or other features of the images.

In the example of FIG. 1, assume that a content-based similarity metric is calculated for each pair of the images shown in FIG. 1. The value of each similarity metric between pairs of images is shown next to a line between the image pairs. In this example, higher metric values indicate greater similarity between images. For example, the value of the content-based similarity metric between image 110 and 140 is 0.8 while the value of the content-based similarity metric between image 120 and 130 is 0.3, which indicates a greater level of similarity between images 110/140 than between images 120/130.

The content-based similarity metrics may be used as, or used as the basis for, "virtual links" between pairs of images 110, 120, 130, and 140. The virtual links can be thought of as analogous to explicit links between objects such as web documents. In contrast to web documents, however, where the links are explicitly defined within the web documents, the virtual links described herein are not explicitly defined and are instead estimated from information such as the content-based similarity metric values.

The virtual links may used to calculate a final ranking score in a manner similar to the way explicit links between web documents are used to calculate ranking scores for documents. PageRank™, for example, is link-based quality score generation technique and is described in "The Anatomy of a Large-Scale Hypertextual Search Engine" by S. Brin and L. Page, 7th International World Wide Web Conference, Brisbane, Australia and U.S. Pat. No. 6,285, 999. A technique such as PageRank™ or another link-based technique may be used to generate the ranking scores for images 110, 120, 130, and 140. The ranking score for each of images 110, 120, 130, and 140 are shown in FIG. 1 as values within boxes next to image 110, 120, 130, and 140.

As shown in FIG. 1, for instance, image 110 may be assigned the ranking score of 0.70, image 120 may be assigned the ranking score of 0.66, image 130 may be assigned the ranking score 0.40, and image 140 may be assigned the ranking score of 0.63. In this example, image 110 may thus be considered to be the highest quality image. In the context of an image search engine, image 110 may be preferentially displayed to a user.

Exemplary Network Overview

Figure 2:
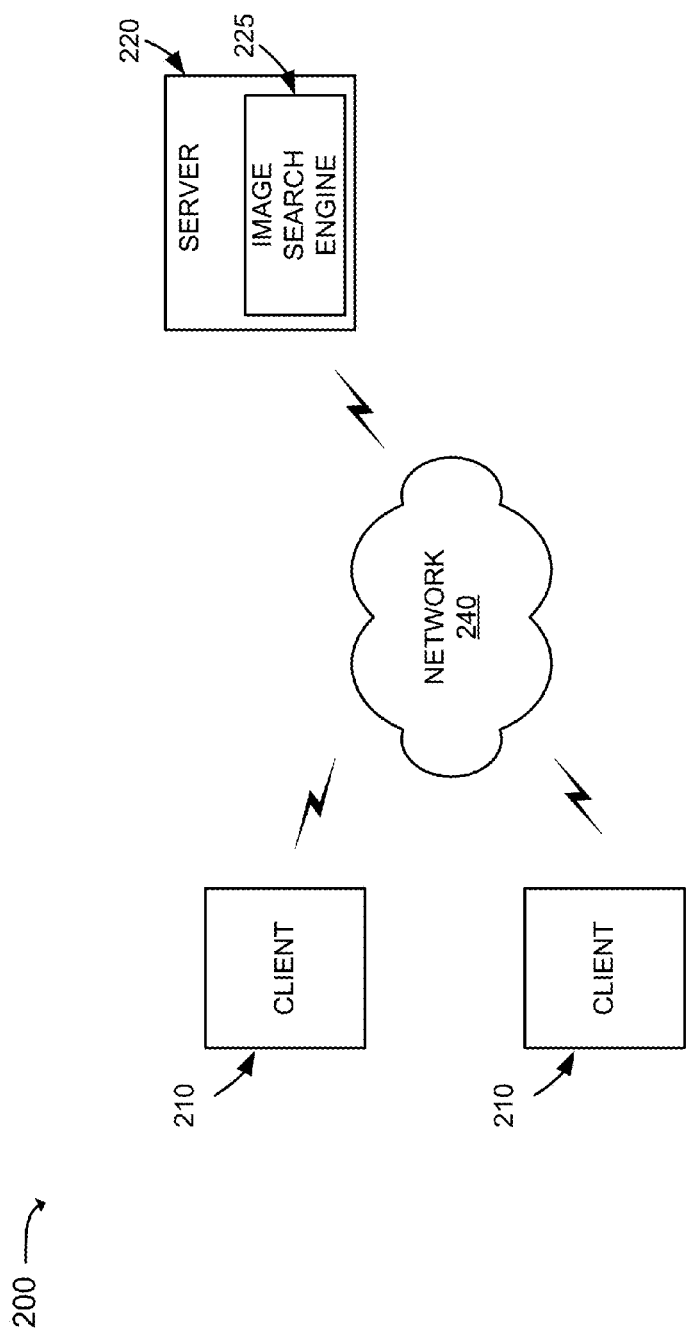
FIG. 2 is a diagram of an exemplary network in which implementations described herein may be implemented.

FIG. 2 is a diagram of an exemplary network 200 in which implementations described herein may be implemented. Network 200 may include multiple clients 210 connected to a server 220 via a network 240. Network 240 may include a local area network (LAN), a wide area network (WAN), a telephone network, such as the Public Switched Telephone Network (PSTN) or a cellular network, an intranet, the Internet, or a combination of networks. Two clients 210 and one server 220 have been illustrated as connected to network 240 for simplicity. In practice, there may be more clients and/or servers. Also, in some instances, a client may perform one or more functions of a server and a server may perform one or more functions of a client.

A client 210 may include a device such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents and images. Clients 210 and server 220 may connect to network 240 via wired or wireless connections.

Server 220 may include an image search engine 225 usable by clients 210. In general, in response to a client request, image search engine 225 may return images to the client that are relevant to the client request.

Exemplary Client/Server Architecture

Figure 3:
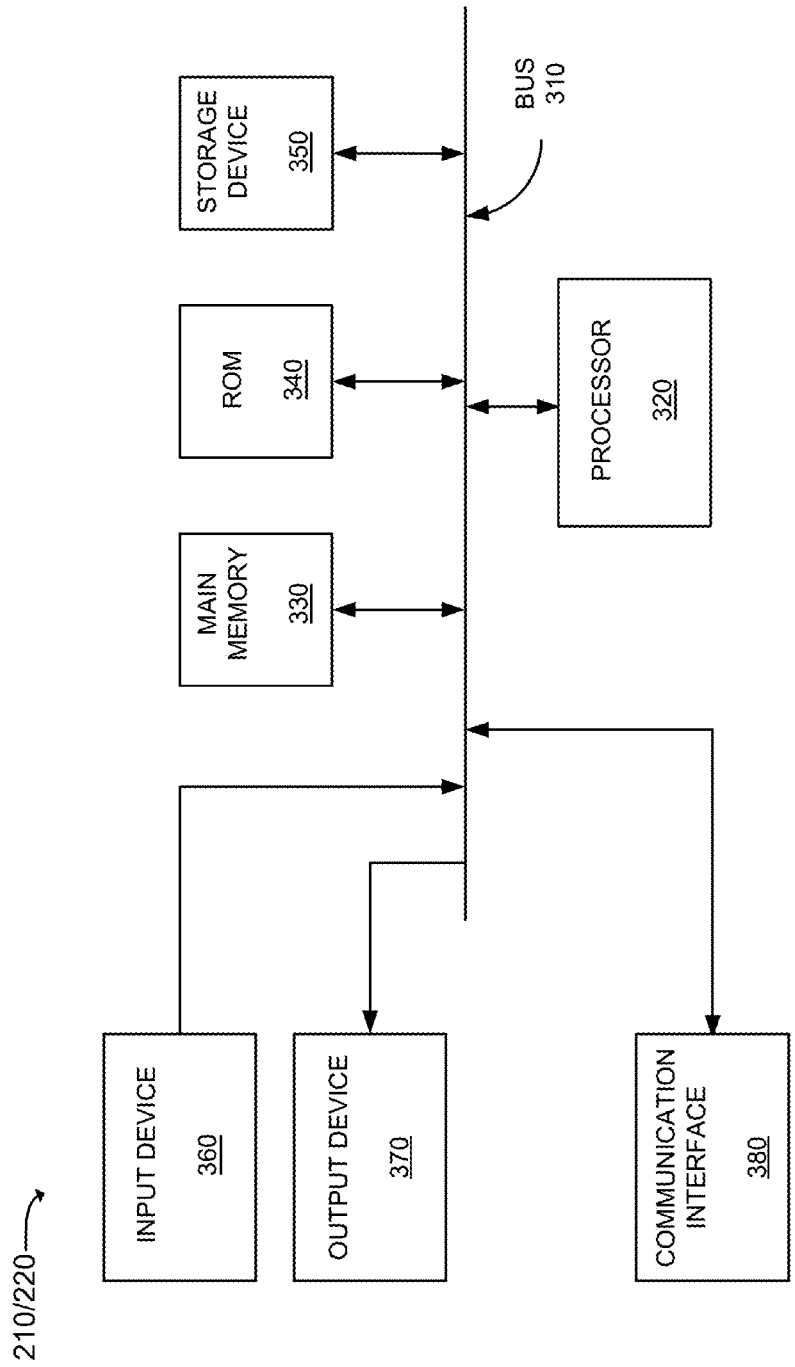
FIG. 3 is a diagram of an exemplary client or server shown in FIG. 2.

FIG. 3 is an diagram of an exemplary client 210 or server 220. Client/server 210/220 may include a bus 310, a processor 320, a main memory 330, a read only memory (ROM) 340, a storage device 350, an input device 360, an output device 370, and a communication interface 380. Bus 310 may include conductors that permit communication among the components of client/server 210/220.

Processor 320 may include a processor(s), a microprocessor(s), or processing logic that interprets and executes instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more mechanisms that permit a user to input information to client/server 210/220, such as a keyboard, a mouse, a pen, voice recognition and/or biometric mechanisms, etc. Output device 370 may include one or more mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

As will be described in detail below, server 220 may implement image search engine 225. Image search engine 225 may be stored in a computer-readable medium, such as memory 330. A computer-readable medium may be defined as one or more physical or logical memory devices.

The software instructions defining image search engine 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes described herein.

Thus, embodiments described are not limited to any specific combination of hardware circuitry and software.

Image Search Engine

Figure 4:
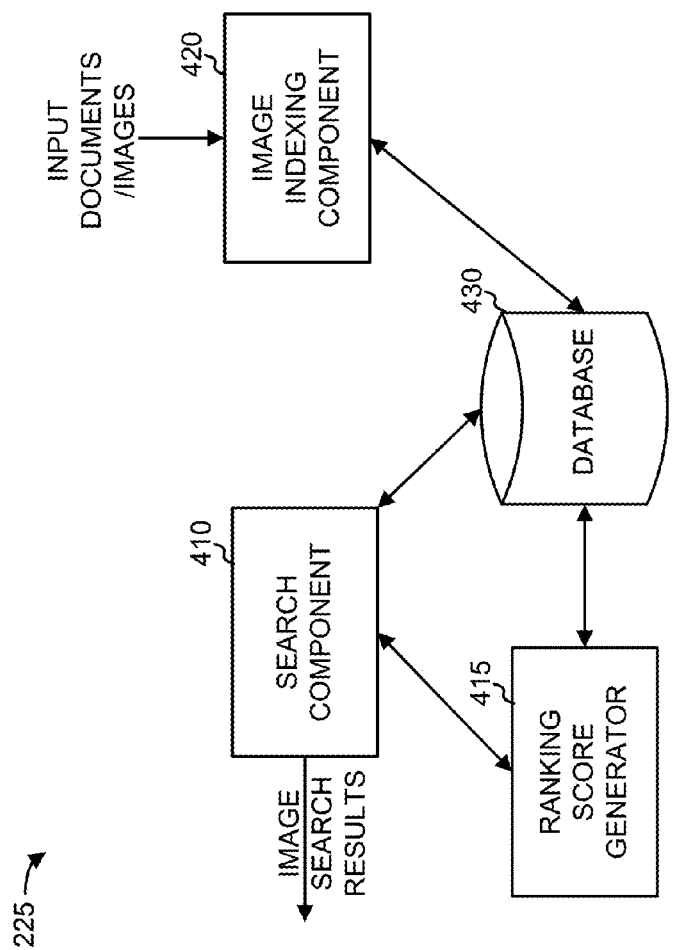
FIG. 4 is a functional block diagram that illustrates an implementation of an image search engine.

FIG. 4 is a functional block diagram that illustrates an implementation of image search engine 225. Image search engine 225 may include a search component 410, a ranking score generator 415, an image indexing component 420, and a database 430. In general, image indexing component 420 may receive input documents, such as HTML web pages retrieved from the web, and parse the input documents for text and images that are to be included in potential results of search engine 225 to a user. In one implementation, image indexing component 420 may store images, or links to images, and image descriptive text in database 430.

Database 430 generally stores a collection of data. Database 430 may be implemented as, for example, a relational or non-relational database capable of storing and accessing data. Database 430 may be implemented on a single computing device or distributed across many computing devices and/or storage devices.

Search component 410 may receive user search queries, such as from clients 210, search database 430 for results based on the search queries, and generate relevant results (i.e., images or links to images) based on a comparison of the search query to the descriptive text for the images that are stored in database 430. In other words, search component 410 may generally match terms in the search query to the descriptive text associated with the images. Additionally, when returning results to the user, search component may take into account the image ranking score determined for the images that match the search query.

The ranking scores may be generated by ranking score generator 415. In some implementations, ranking score generator 415 may dynamically generate the ranking scores for images in a set of images that initially match the user's query. In another implementation, ranking score generator 415 may generate the ranking scores "offline" (i.e., not in response to a user search query) based on, for example, all of the indexed images or based on subsets of the indexed images. The generated ranking scores may be stored in database 430. Although shown as a separate element in FIG. 4, in some implementations, ranking score generator 415 may be considered as being part of search component 410 or image indexing component 420.

The calculation of the ranking scores by ranking score generator 415 will be described in additional detail below.

Ranking Score Generator

In general, the ranking score for an image can be though as a probability distribution that represents the likelihood that a hypothetical user selects a particular image given the following:

(1) The user randomly selects an image, called image A, from a collection of images.

(2) Given image A, the hypothetical user requests to view similar images and is shown the top N resultant images sorted according to the similarity between image A and the N images.

(3) The user selects another image, called image B, based on a transitional probability of selecting image B given image A.

(4) Image A is set to image B and (1) through (3) are repeated. To summarize (1) through (4), if the user is not satisfied with the initial results, the user can select one image among the search results and browse through a new set of "similar" images. The user may then select another image and continue this process until the user finishes the current search session.

The mechanism described in the preceding paragraph may create probabilistic hyperlinks between images, where the user jumps from one image to another following a certain probability distribution (called the transitional probability, $P(A \rightarrow B)$, herein). Given N images with interconnected probability hyperlinks, a Markov network with images as nodes and similarity measurements as transitional links is essentially created. The image ranking score for each image may therefore be viewed as the stationary probabilistic distribution for the Markov network.

It can be appreciated that the accuracy of the image ranking score for an image depends on the accurate estimation of the transitional probability, $P(A \rightarrow B)$, given two images A and B.

Figure 5:
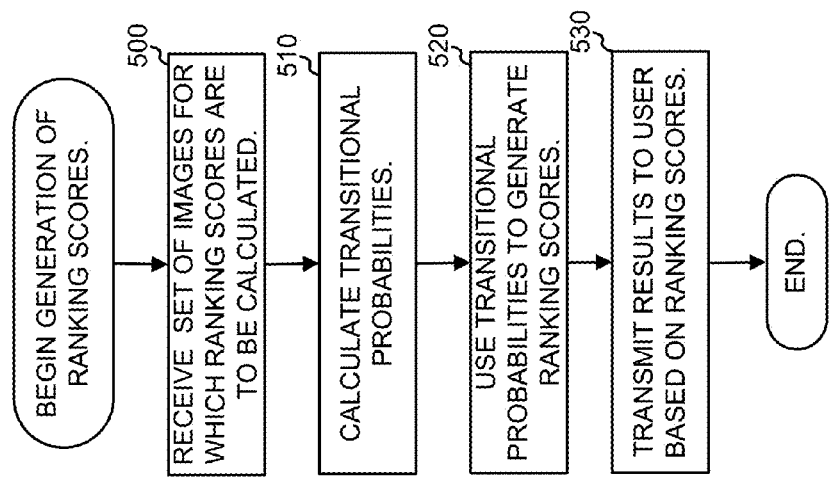
FIG. 5 is a flow chart illustrating exemplary operations that may be performed in generating ranking scores for images.

FIG. 5 is a flow chart illustrating exemplary operations that may by performed by ranking score generator 415 in generating ranking scores for images. Ranking score generator 415 may begin by receiving a set of images for which the ranking scores are to be calculated (act 500). For example, the set of images may be the entire set of images indexed by image indexing component 420 or a subset of these images. With respect to calculating the ranking scores on a subset of images of the entire set of images, the ranking scores may be generated, for example, for a subset of images that correspond to a particular category of images or for the set of images identified in response to a search query.

Ranking score generator 415 may calculate the transitional probabilities, $P(A \rightarrow B)$, between each image A and each other image B (act 510). As previously mentioned, this represents the estimated probability that a user viewing image A will select image B. The transitional probabilities may be estimated based on content-based similarity metric(s). Calculation of the transitional probabilities is described in more detail below with reference to FIGS. 6-9.

The transitional probabilities may be used to determine the ranking scores (act 520). Generation of the ranking scores from the transitional probabilities is described in more detail below.

Results may be output or transmitted to users based on the ranking scores (act 530). For example, in an image search, images returned to the user may be sorted in an order determined by or influenced by the ranking scores.

Figure 6:
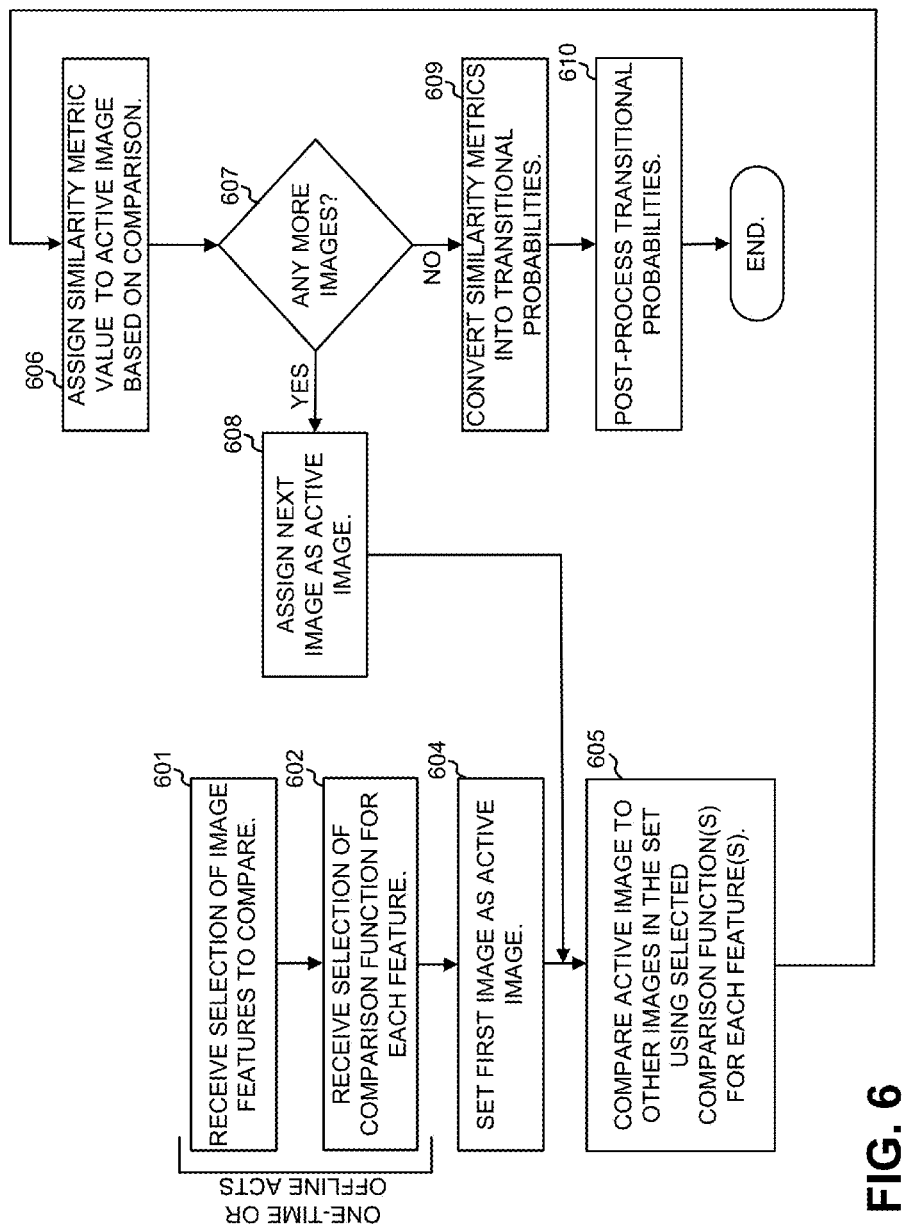
FIG. 6 is a flow chart illustrating exemplary operations that may be performed in generating transitional probabilities for an input set of images.

FIG. 6 is a flow chart illustrating exemplary operations that may by performed to generate the transitional probabilities for an input set of images. In one implementation, the transitional probabilities may be generated for images by comparing images in the set of images to one another on an image feature basis.

A number of different image features may be used to compare the images. The particular image features to use may be decided ahead of time or offline by an administrator. Ranking score generator 415 may receive the selection of which features to use (act 601). Examples of image features that may be used include image features based on, for example, intensity, color, edges, texture, wavelet based techniques, or other aspects of the image. For example, regarding intensity, each image may be divided into small patches (e.g., rectangles, circles, etc.) and an intensity histogram computed for each patch. Each intensity histogram may be considered to be a feature for the image. Similarly, as an example of a color-based feature, a color histogram may be computed for each patch (or for different patches) within each image. A color histogram can be similarly computed to obtain a possible color-based histogram. The color histogram may be calculated using any known color space, such as the RGB (red, green, blue) color space, YIQ (luma (Y) and chrominance (IQ)), or another color space.

Histograms can also be used to represent edge and texture information. For example, histograms can be computed based on patches of edge information or texture information in an image. For wavelet based techniques, a wavelet transform may be computed for each patch and used as an image feature.

The features discussed above represent an exemplary list of possible image features that may be used. Other image features, such as features identified using the known Scale-Invariant Feature Transform (SIFT) may be used.

In some implementations, to improve computation efficiency, features may be computed only for certain areas within images. For example, "objects of interest" within an image may be determined and image features may only be computed for the objects of interest. For example, if the image feature being used is a color histogram, a histogram may be computed for each patch in the image that includes an object of interest. Objects of interest within an image can be determined in a number of ways. For example, for color, objects of interest may be defined as points where there is high variation in color (i.e., areas where color changes significantly). In general, objects of interest can be determined mathematically in a variety of ways and are frequently based on determining discontinuities or differences from surrounding points. The SIFT algorithm is an example of one technique for locating objects of interest.

Additionally, in some implementations, the various features described above may be computed using different image scales. For example, an image can be examined and features computed in its original scale and then features may be successively examined at smaller scales. Additionally or alternatively, features may be selected as features that are scale invariant or invariant to affine transformations. The SIFT techniques, for example, can be used to extract distinctive invariant objects from images. The extracted objects are invariant to image scale and rotation.

For each feature that is to be used, a comparison function may be selected. A number of different comparison functions may be used to compare images. The particular comparison function to use may be decided ahead of time or offline by an administrator. Ranking score generator 415 may receive the selection of the comparison functions (act 602).

In general, a comparison function may operate to generate a value defining a similarity between a particular feature computed for two images. As an example of a possible comparison function, consider a simple histogram comparer function, which is described in pseudo-code in Table I, below. As shown in Table I, the histogram comparer function returns a value that is the sum of the absolute values of the differences between corresponding bins in the input histograms. Smaller values returned from this function indicate greater similarity between the input histograms.

TABLE I

Compare_histogram_type_features(histogram1,histogram2)
   Difference = 0;
   For all bins, b, in histogram:
      Difference = Difference + |histogram1 [b] −
      histogram2 [b] |
   Return (Difference).

The histogram comparer function is exemplary. It can be appreciated that other comparison functions can be used to compare histograms. For example, squared differences may be used rather than absolute differences, bin correlations may be taken into account instead of absolute differences, or percent differences may be used instead of absolute differences. Additionally, for image features other than those based on histograms, different comparison functions may, of course, be used.

The selection of the image features to use and the comparison functions to use (acts 601 and 602) may be performed offline or in non-runtime operation. For example, an administrator may initially design or configure ranking score generator 415 to use one or more image features and one or more comparison functions. After these initial acts, ranking score generator 415 may function in a runtime mode (acts 604-610).

In one possible implementation, the selection of image features to use and the comparison functions to use (acts 601 and 602) may define a set of possible image features and comparison functions. During runtime operation, the set of possible image features and comparison functions may be dynamically narrowed. For example, the number of matches for a feature across the images for that feature may be used as a measure as to whether the feature is interesting. Assume, for instance, that the user query "black and white pictures of the london tower" initially generated a number of black and white images. With this set of images, using a color histogram as a feature is not likely to be very helpful. However, other features, such as edge-based features, may play a more important part as they may be more distinguishing. A number of techniques may be used to determine whether a feature is interesting for a set of images, such as techniques based on the variation, distribution, or entropy in the responses across images for a feature.

Ranking score generator 415 may set the first received image as the active image (act 604). The active image may then be compared to each other image in the set of images (act 605). The comparison may be based on the image features from act 501 and may be performed using the comparison functions from act 502.

An exemplary implementation of act 605 is shown in pseudo-code in Table II, below. In Table II, the final feature similarity metric is tabulated in the variable "image_similarity_score."

TABLE II image_similarity_score = 0
   For each feature $F_i$ of active image i:
      For each image j (where j is not i):
         For each feature $F_j$ of image j that is of type $F_i$
            feature_similarity_score = compare_features($F_i$, $F_j$)
            image_similarity_score = image_similarity_score +
                feature_similarity_score In the implementation of act 605 shown in Table II, each feature $F_i$ of the active image is compared with every feature $F_j$ of image j that is the same feature type. In other words, if $F_i$ is a color histogram then the comparison is performed with the color histogram features of image j, if $F_i$ is an edge histogram then the edge histogram features of image j are compared, etc.

Ranking score generator 415 may assign a similarity metric value to the active image based on the comparison of act 605 (act 606). For example, the "image_similarity_score" variable (see Table II) indicates how well the features in image i appear in other images and, in this implementation, represents the similarity metric assigned to the active image. In this implementation, image_similarity_score is simply the sum of the feature similarity scores for an image. In other implementations, the similarity metric may be calculated in other ways, such as by only adding the value of the variable "feature_similarity_score" to "image_similarity_score" when "feature_similarity_score" is above some threshold. In general, the similarity metric may be designed so that more similar image features will contribute more significantly to the similarity metric.

Acts 605 and 606 may be repeated for each image in the set of images (acts 607 and 608) to thus obtain a similarity metric for each image in the set of images.

Acts 605-608 can be relatively computationally expensive, as it requires $N^2$ comparisons among the N images, and for each comparison, $M_i*M_j$ feature comparisons, for $M_i$ and $M_j$ local features in each image. Techniques are known that may potentially accelerate this type of operation. For example, one such technique is described in the publication "The Pyramid Match Kernel: Discriminative Classification with Sets of Image Features," K. Grauman et al., Proceedings of the IEEE International Conference on Computer Vision, Beijing, China, October 2005.

Additionally, it can be appreciated that to further increase run-time processing performance, the features used for each of the images may be pre-computed ahead of time and stored, for instance, in database 430.

The similarity metrics generated in acts 605 through 608 may be converted to transitional probabilities (act 609). The transitional probability that a hypothetical user viewing an image A selects an image B, P(A→B), may be conceptualized based on the following two intuitions: (1) the user is more likely to select an image that is similar to image A than an image that is not; and (2) the user is likely to ignore images that are too similar to image A. Intuition (2) reflects the notion that images that are too similar to the currently selected image are essentially redundant to the user.

Figure 7:
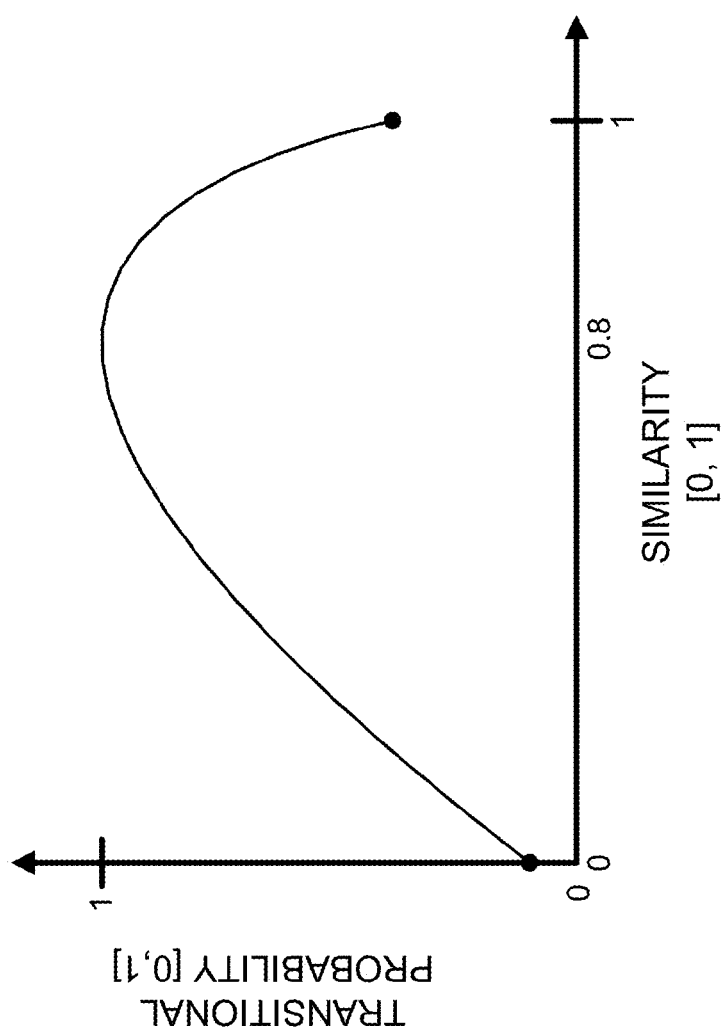
FIG. 7 is a graph illustrating an exemplary distribution that can be used to convert similarity metrics into transitional probabilities.

In one implementation, intuition (1) and (2) may be incorporated into a transitional probability based on a beta distribution over the similarity metric values calculated in act 606. FIG. 7 is a graph 700 illustrating one possible distribution, called a conversion function herein, that can be used to convert similarity metrics into transitional probabilities. In graph 700, the x-axis represents the similarity metric between image A and B and the y-axis is its corresponding transitional probability. In the exemplary function defined by graph 700, P(A→B) increases monotonically as the value of the similarity metric increases, but drops off sharply when the similarity metric value is above a cutoff point (approximately 0.8 in this example). In this example, assume that the similarity metric value ranges between zero and one.

It can be appreciated that many other functions could be used to express the probability of selecting an image relative to similarity. Further, in some implementations, the function may be an "editable" function. For example, the user may be able to use a settable slider or other graphical tool to set the type of images the user is looking for (e.g., very similar images or less similar images).

Referring back to FIG. 6, in some implementations, the transitional probabilities may optionally be post-processed to potentially improve the transitional probabilities (act 610). This can be useful to make the transitional probabilities more closely correspond to user behavior in the real world. For example, the user may prefer a colorful image over a black-and-white image although the two images may have the same similarity score.

One possible way to enhance the effectiveness of the transitional probabilities is based on query independent metrics of images.

Figure 8:
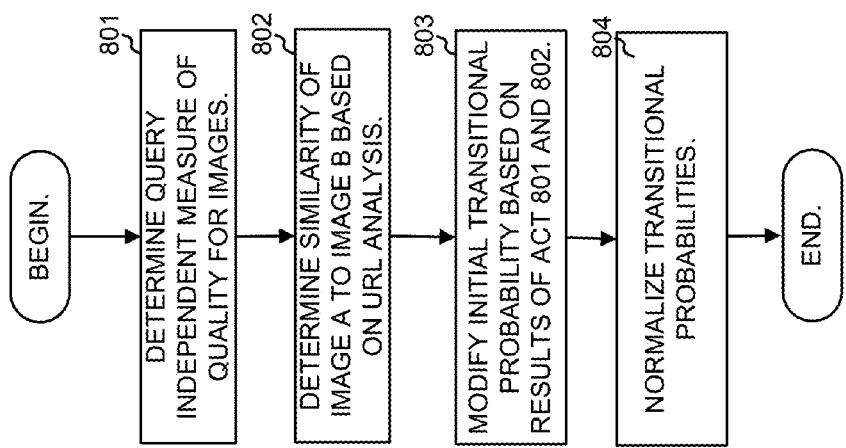
FIG. 8 is a flow chart illustrating exemplary operations for post-processing transitional probabilities.

FIG. 8 is a flow chart illustrating exemplary operations for enhancing the effectiveness of the transitional probabilities via post-processing of the transitional probabilities as performed in act 610. The operations shown in FIG. 8 may be performed for each transitional probability, P(A→B), between a document A and a document B.

A query independent measure of quality, called Quality (A), may be determined for image A (act 801). Quality(A) may, for example, measure how much or how well an image is in focus, how many colors are in the image, or the saturation of the image. Techniques are known for measuring the "focus" of an image. Such techniques may be based on the sharpness of the image and will not be described further herein. Similarly, techniques for determining the number of colors in an image and determining a measure of the saturation of an image are also known and will not be described further herein.

Another possible factor for improving transitional probabilities is based on a URL (uniform resource locator) analysis. Two images may be considered to be related when the corresponding web pages the images are related. For example, the user may enjoy finding images that are from the same blog, same website, or from the same social network. Techniques are known for estimating "similarity" based on relations between objects, such as hyperlinks between web pages. One such technique is described in the publication "SimRank: A Measure of Structural-Context Similarity," G. Jeh and J. Widom, Proceedings of the eighth ACM SIGKDD International Conference on Knowledge Discovery and Data Mining, 2002.

A value measuring similarity of image A to image B based on the URL analysis may be determined (act 802). This "hyperlink-induced" similarity between image A and image B will be referred to a LINKSIM(A, B) herein. LINKSIM (A, B) may be determined based on the web pages containing images A and B. For example, the SimRank technique, or another technique capable of estimating similarity based on relationships between objects, may be used to calculate LINKSIM(A,B).

The initial transitional probability, P(A→B), determined in act 609 may be modified or calculated based on Quality (A) and LINKSIM(A,B) (act 803). For example, P(A→B) may be recalculated as $$Quality(A) \cdot LINKSIM(A,B) \cdot SIMILARITY(A,B),$$

where SIMILARITY(A,B) may refer to a distribution defined over the raw similarity metric values.

In some implementations, P(A→B), as determined in act 803, may also be normalized to obtain a desired distribution of the transitional probabilities (act 804). The normalization may be performed, for example, after a number of or after all of the transitional probabilities are calculated.

It can be appreciated that the post processing performed in act 610 may include additional or fewer factors than those shown in FIG. 8. For example, instead of using Quality(A) and LINKSIM(A, B), only one of these factors may be used.

Referring back to FIG. 5, the transitional probabilities calculated in act 510 may be used to generate ranking scores (act 510). In general, in one implementation, the ranking score for a particular image may be a function of the ranking scores and transitional probabilities of other images that have a transitional probability of transitioning to the particular image. Stated more formally, given a set of images $M_1, M_2, M_3, \ldots M_n$, the ranking score for a given image, $I(M)$, may be defined recursively as:

$I(M_1) = I(M_2) \cdot P(M_2 \rightarrow M_1) +$ $I(M_3) \cdot P(M_3 \rightarrow M_1) +$ $\ldots$ $I(M_n) \cdot P(M_n \rightarrow M_1) +$ $I(M_2) = I(M_1) \cdot P(M_1 \rightarrow M_2) +$ $I(M_3) \cdot P(M_3 \rightarrow M_2) +$ $\ldots$ $I(M_n) \cdot P(M_n \rightarrow M_2) +$ $\ldots$ $I(M_n) = I(M_1) \cdot P(M_1 \rightarrow M_n) +$ $I(M_2) \cdot P(M_2 \rightarrow M_n) +$ $\ldots$ $I(M_{n-1}) \cdot P(M_{n-1} \rightarrow M_n) +$ Alternatively, it is noted that the ranking scores are also the entries of the dominant eigenvector of the transitional probability matrix. Stated formally:

$$RankingScores = \begin{bmatrix} I(M_1) \\ I(M_2) \\ I(M_3) \\ \ldots \\ I(M_4) \end{bmatrix},$$

where RankingScores is the solution for $$RankingScores = \begin{bmatrix} P(M_1 \rightarrow M_1) & P(M_2 \rightarrow M_1) & P(M_n \rightarrow M_1) \\ P(M_1 \rightarrow M_2) & \ldots & P(M_n \rightarrow M_2) \\ \ldots & & \ldots \\ P(M_1 \rightarrow M_n) & \ldots & P(M_n \rightarrow M_n) \end{bmatrix} \cdot RankingScores, \quad (Eq.\ 1)$$

(Eq. 1) where each column sums to one.

In some implementations, a damping factor may be used. The damping factor may model the idea that the user is likely to stop selecting images at some point. For example, a damping factor d may be defined to have a value between zero and one. With the damping factor, equation (1) becomes:

$$RankingScores = \begin{bmatrix} \frac{1-d}{N} \\ \frac{1-d}{N} \\ \ldots \\ \frac{1-d}{N} \end{bmatrix} +$$

$$d \cdot \begin{bmatrix} P(M_1 \rightarrow M_1) & P(M_2 \rightarrow M_1) & P(M_n \rightarrow M_1) \\ P(M_1 \rightarrow M_2) & \ldots & P(M_n \rightarrow M_2) \\ \ldots & & \ldots \\ P(M_1 \rightarrow M_n) & \ldots & P(M_n \rightarrow M_n) \end{bmatrix} \cdot RankingScores.$$

The ranking scores described above provide a link-based measure of quality for objects (e.g., images) that do not necessarily include explicit links between objects. The ranking scores were instead calculated based on "virtual" links determined for the objects based on similarity information (i.e., the transitional probabilities) of the objects. In one possible alternative implementation, the transitional probabilities, instead of being based on similarity information, may be based on user click data.

Figure 9:
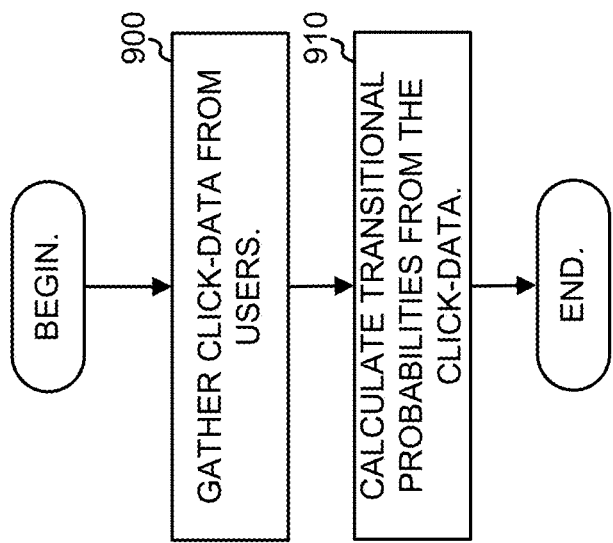
FIG. 9 is a flow chart illustrating exemplary operations that may be performed generating transitional probabilities for an input set of objects using click-data.

FIG. 9 is a flow chart illustrating exemplary operations that may be performed to generate the transitional probabilities (as calculated in FIG. 5, act 510) for an input set of objects (e.g., images) using click-data. "Click-data," as used herein, refers to data gathered from users selecting one or more objects from a larger set of objects. For example, multiple thumbnail images may be displayed to a user in response to the user submitting a search query to an image search engine. The image search engine may log the images eventually selected by the user from the result set of thumbnail images. This logged information may be considered click-data in this situation.

Referring to FIG. 9, click-data may be gathered from users (act 900). The click-data may describe, for example, the number of times or the portion of the time that a user viewing a first image then selects a second image. The click-data may be gathered from, for example, user interaction with a web site, such as a search engine, or through information gathered by a toolbar or other program installed at a computer of the user. As one example of useful click-data, consider the situation in which a user is viewing multiple images in a single viewing session. The images may be displayed by, for example, an on-line photograph storage site or an image search image. It may be assumed that when a user clicks on multiple images in such a session, that the images are similar.

The transitional probabilities may be calculated based on the gathered click-data (act 910). In one implementation, the click data may be used to directly calculate the transitional probabilities. For example, assume that the click-data includes 1000 samples of users viewing a first image A and then selecting a second image B. Assume that of these 1000 samples, 100 times the second image selected by the users was image B. The transitional probability, $P(A \rightarrow B)$, may be directly calculated as 0.10.

In one implementation, the click-data described above may be used by itself to generate the transitional probabilities. In an alternative implementation, the click-data may be used in addition to the similarity metric values to generate the transitional probabilities. In still another implementation, the click-data may be used to modify the similarity metric values or vice-versa.

The ranking scores described above were generally described as being generated over a set of images (act 500, FIG. 5). The set can be, for example, all of the images indexed by image indexing component 420 or a subset of these images. In general, the set of images may be determined in a search query-independent manner. In some implementations, a query-dependent calculation of the ranking scores may also be performed.

For a query-dependent calculation of the ranking scores, the initial set of images determined in act 500 may be the set of images returned by search engine 225 in response to the initial user search query. For example, if the user submits the search query "Lincoln Memorial," search engine 225 may retrieve a number of result images (e.g., hundreds or thousands) that are associated with text that matches the search query.

Figure 10:
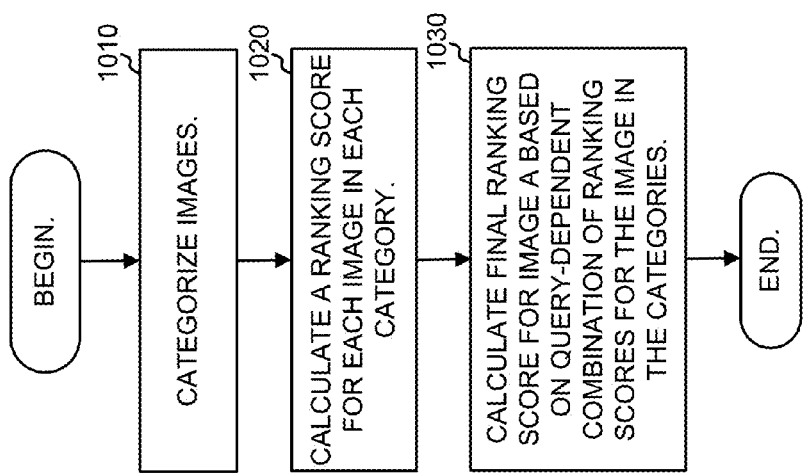
FIG. 10 is a flow chart illustrating exemplary operations for performing a query-dependent calculation of ranking scores.

Other techniques for performing query-dependent calculation of the ranking scores are possible. FIG. 10 is a flow chart illustrating exemplary operations for performing a query-dependent calculation of ranking scores.

As shown in FIG. 10, the set of available images may be divided into a number of categories (act 1010). For example, N categories may be defined. The categories may be defined relatively coarsely, such as, for example, "outdoor," "indoor," "cars," "portraits," "drawings," etc. Images can be categorized in a number of ways, such as based on text associated with the images (e.g., text surrounding an image in a web page that includes the image) or by classification based on the features of the images.

Each category of images defines a set of images. For each set, a ranking score may be calculated as previously discussed with respect to FIG. 5 (act 1020). In some implementations, an image may be categorized as belonging to multiple categories. In this situation, the image may be associated with multiple ranking scores.

The ranking score used by search engine 225 when returning images to the user (the "final" ranking score for the image) may be calculated as a query-dependent combination of ranking scores for the image in the categories (act 1030). In one implementation, the query-dependent final ranking score may be calculated as a linear combination of the category ranking scores. More specifically, the final ranking score for an image A, under a query Q, may be calculated as:

$$I(A,Q)=I(A,Q,C_1)\cdot W_1+I(A,Q,C_2)\cdot W_2+\ldots+I(A,Q,C_N)\cdot W_N,$$

where $I(A,Q)$ refers to the ranking score of image A under query Q, $I(A,Q,C_i)$ refers to the ranking score of image A when calculated over the set of images that match the Query, Q, and are in category $C_i$, and $W_i$ refers to a weight value by which $I(A,C_i)$ is multiplied. In one implementation, the weights, $W_i$, may be calculated based on the semantic distance between the query, Q, and the image category. For example, if Q equals "beach" then the category may be most likely to be "outdoor" and the corresponding weight should be significantly larger than the weight for a category such as "indoor."

Exemplary Applications

As previously mentioned with respect to FIGS. 2 and 4, image search engine 225 may generally operate to transmit images or links to images to a user in response to a user search query. The ranking scores may be used by image search engine 225 to assist in ordering the images returned to the user. For example, images may be presented to the user in an order sorted from maximum to lowest ranking score. In some implementations, the ranking score of an image may be combined with a relevance score that defines how well text associated with the image matches the user search query. In this situation, images may be presented to the user in an order sorted from maximum to lowest of this combined value. More generally, the ranking score can be used in isolation or in combination with other signals relating to image quality. The ranking scores may also be used by image search engine 225 to determine a subset of images to return to a user from a larger set of possible images.

The ranking scores may be employed in contexts other than a general image search engine. In general, any application in which images are to be ranked or in which a subset of an initial set of images are to be selected may be an application that is appropriate for application of ranking score generator 415. For example, in an image search performed by a user using a mobile device, in which the display area is limited, it may be desirable to prune the number of images returned to the user to some small number (e.g., 5).

Ranking score generator 415 may additionally be used in situations in which it is desirable to find a single most representative image from a set of images. For example, in a product search engine or a news search engine, it may be desirable to display a single image next to a product listing or next to a news article. For a product search engine, for instance, the name of the product may be used as a search query to return an initial set of possible product images. Ranking score generator 415 may be used as described above to rank the initial set of product images. The single highest ranking product image may be chosen to display next to the product listing. Similarly, for a news article search engine, selected text from the news article may be used as a search query to return an initial set of possible images. Ranking score generator 415 may be used as described above to rank the initial set of images. The single highest ranking image may be chosen to display next to the news listing.

Further, the concepts described herein may be applied to applications other than image-based applications. For example, a ranking score calculated as described above may be generated for other sets of objects for which transitional probabilities can be generated. For example, ranking scores can be calculated for audio media objects (e.g., songs, audio books, audio clips, etc.) or video media objects (e.g., movies, short video clips, etc.). Other domains in which ranking scores can be calculated include book search, stock search, product search, resume search, or other search tasks where the user may find a "see more items like this one" option useful. In general, the above-described ranking scores can be calculated for any set of objects in which it is possible to create virtual links based on similarity of the objects or other information, such as user click behavior.

CONCLUSION

As described above, a set of objects are processed to rank the objects using link-based ranking techniques even when the objects do not include explicit links between them. Instead, virtual links may be generated based on, for example, similarity between objects or click-data.

The foregoing description of exemplary embodiments provides illustration and description, but is not intended to be exhaustive or to limit the embodiments to the precise form disclosed. Modifications and variations are possible in light of the above teachings or may be acquired from practice of the invention.

Moreover, while a series of acts have been described with regard to FIGS. 5, 6, and 8-10, the order of the acts may be varied in other implementations. Moreover, non-dependent acts may be implemented in parallel.

It will also be apparent that aspects, as described above, may be implemented in many different forms of software, firmware, and hardware in the implementations illustrated in the figures. The actual software code or specialized control hardware used to implement these aspects is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions described herein may be implemented as "components" or "models" that performs one or more functions. These components/models may be implemented as hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A computer-implemented method comprising:
    receiving, by one or more server computers, a selection of a plurality of image feature types;
    for each received image feature type, obtaining, by the one or more server computers, a set of one or more comparison functions;
    receiving, by the one or more server computers, a search query from a user device;
    obtaining, by the one or more server computers, a set of images that includes two or more images that are responsive to the search query from the user device;
    generating, by the one or more server computers, a ranking score for the set of images, wherein generating the ranking score includes:
        for each pair of images in the set of images, applying, by the one or more server computers, each of the comparison functions to one or more objects of interest identified in each image in the pair of images to generate a respective similarity score for the pair of images;
        generating, by the one or more server computers, transitional probabilities for each image in the set of images based on the respective similarity scores generated for each pair of images, wherein each transitional probability is indicative of the likelihood that a user that has accessed a first image in the set of images will access a second image in the set of images;
        generating, by the one or more server computers, a ranking score for each image in the set of images based on the transitional probabilities that were generated for the image;
    selecting, by the one or more server computers, one or more images based on the generated ranking score;
    providing, by the one or more server computers, the one or more images that were selected based on the generated ranking score for display in the user interface of the user device.

2. The method of claim 1, the method further comprising:
    identifying, by the one or more server computers, a subset of one or more comparison functions from the set of one or more comparison functions based on the received feature types; and
    for each pair of images in the set of images, applying, by the one or more server computers, only the subset of one or more comparison functions to one or more objects of interest identified in each image in the pair of images to generate a respective similarity score for each pair of images.

3. The method of claim 1, wherein applying, by the one or more server computers, each of the comparison functions to the pair of images to generate a respective similarity score for each pair of images includes:
    identifying, by the one or more server computers, a first feature associated with a first image;
    using, by the one or more server computers, one or more of the comparison functions to evaluate the first feature against a corresponding feature of each respective image in the set of images to generate a similarity score for each pair of images, wherein each similarity score is a measure of the extent that the first feature appears in a second image of each respective image pair;
    generating, by the one or more server computers, a cumulative similarity score by summing the similarity score for each pair of images; and
    associating, by the one or more server computers, the cumulative similarity score with the first image.

4. The method of claim 1, the method further comprising:
    for each feature associated with a first image:
        using, by the one or more server computers, one or more of the comparison functions to evaluate the feature of the first image against a corresponding feature of each respective image in the set of images to generate a similarity score corresponding to each feature pair, wherein each similarity score is a measure of the extent that the feature of the first image corresponds to another feature in a second image of each respective image pair; and
        determining, by the one or more server computers, whether each similarity score
    exceeds a predetermined similarity score threshold;
    generating, by the one or more server computers, a cumulative similarity score by summing each of the similarity scores that exceed the predetermined similarity score threshold; and
    associating, by the one or more server computers, the cumulative similarity score with the first image.

5. The method of claim 1, the method further comprising:
    adjusting, by the one or more server computers, the transitional probability associated with a first image of a pair of images based on a query independent quality of the first image.

6. The method of claim 1, the method further comprising:
    adjusting, by the one or more server computers, the transitional probability associated with a first image of a pair of images based on a determination that a first URL of a webpage that includes the first image is related to a second URL of a webpage that includes the second image.

7. The method of claim 1, wherein the one or more objects of interest are identified based on a variation in color between two or more portions of an image in the pair of images.

8. A system comprising:
    one or more processors and one or more computer storage media storing instructions that are operable, when executed by the one or more processors, to cause the one or more processors to perform operations comprising:

receiving, by one or more server computers, a selection of a plurality of image feature types;

for each received image feature type, obtaining, by the one or more server computers, a set of one or more comparison functions;

receiving, by the one or more server computers, a search query from a user device;

obtaining, by the one or more server computers, a set of images that includes two or more images that are responsive to the search query from the user device;

generating, by the one or more server computers, a ranking score for the set of images, wherein generating the ranking score includes:

for each pair of images in the set of images, applying, by the one or more server computers, each of the comparison functions to the pair of images to one or more objects of interest identified in each image in the pair of images to generate a respective similarity score for the pair of images;

generating, by the one or more server computers, transitional probabilities for each image in the set of images based on the respective similarity scores generated for each pair of images, wherein each transitional probability is indicative of the likelihood that a user that has accessed a first image in the set of images will access a second image in the set of images;

generating, by the one or more server computers, a ranking score for each image in the set of images based on the transitional probabilities that were generated for the image;

selecting, by the one or more server computers, one or more images based on the generated ranking score;

providing, by the one or more server computers, the one or more images that were selected based on the generated ranking score for display in the user interface of the user device.

9. The system of claim 8, the operations further comprising:

identifying, by the one or more server computers, a subset of one or more comparison functions from the set of one or more comparison functions based on the received feature types; and for each pair of images in the set of images, applying, by the one or more server computers, only the subset of one or more comparison functions to one or more objects of interest identified in each image in the pair of images to generate a respective similarity score for each pair of images.

10. The system of claim 8, wherein applying, by the one or more server computers, each of the comparison functions to the pair of images to generate a respective similarity score for each pair of images includes:

identifying, by the one or more server computers, first feature associated with a first image;

using, by the one or more server computers, one or more of the comparison functions to evaluate the first feature against a corresponding feature of each respective image in the set of images to generate a similarity score for each pair of images, wherein each similarity score is a measure of the extent that the first feature appears in a second image of each respective image pair;

generating, by the one or more server computers a cumulative similarity score by summing the similarity score for each pair of images; and associating, by the one or more server computers, the cumulative similarity score with the first image.

11. The system of claim 8, the operations further comprising:

for each feature associated with a first image:

using, by the one or more server computers, one or more of the comparison functions to evaluate the feature of the first image against a corresponding feature of each respective image in the set of images to generate a similarity score corresponding to each feature pair, wherein each similarity score is a measure of the extent that the feature of the first image corresponds to another feature in a second image of each respective image pair; and determining, by the one or more server computers, whether each similarity score exceeds a predetermined similarity score threshold;

generating, by the one or more server computers, a cumulative similarity score by summing each of the similarity scores that exceed the predetermined similarity score threshold; and associating, by the one or more server computers, the cumulative similarity score with the first image.

12. The system of claim 8, the operations further comprising:

adjusting, by the one or more server computers, the transitional probability associated with a first image of a pair of images based on a query independent quality of the first image.

13. The system of claim 8, the operations further comprising:

adjusting, by the one or more server computers, the transitional probability associated with a first image of a pair of images based on a determination that a first URL of a webpage that includes the first image is related to a second URL of a webpage that includes the second image.

14. The system of claim 8, wherein the one or more objects of interest are identified based on a variation in color between two or more portions of an image in the pair of images.

15. A non-transitory computer-readable medium having stored thereon instructions, which, when executed by one or more computers, cause the one or more computers to perform operations of:

receiving, by one or more server computers, a selection of a plurality of image feature types;

for each received image feature type, obtaining, by the one or more server computers, a set of one or more comparison functions;

receiving, by the one or more server computers, a search query from a user device;

obtaining, by the one or more server computers, a set of images that includes two or more images that are responsive to the search query from the user device;

generating, by the one or more server computers, a ranking score for the set of images, wherein generating the ranking score includes:

for each pair of images in the set of images, applying, by the one or more server computers, each of the comparison functions to the pair of images to one or more objects of interest identified in each image in the pair of images to generate a respective similarity score for the pair of images;

generating, by the one or more server computers, transitional probabilities for each image in the set of images based on the respective similarity scores generated for each pair of images, wherein each transitional probability is indicative of the likelihood that a user that has accessed a first image in the set of images will access a second image in the set of images;

generating, by the one or more server computers, a ranking score for each image in the set of images based on the transitional probabilities that were generated for the image;

selecting, by the one or more server computers, one or more images based on the generated ranking score;

providing, by the one or more server computers, the one or more images that were selected based on the generated ranking score for display in the user interface of the user device.

16. The computer-readable medium of claim 15, the operations further comprising:

identifying, by the one or more server computers, a subset of one or more comparison functions from the set of one or more comparison functions based on the received feature types; and for each pair of images in the set of images, applying, by the one or more server computers, only the subset of one or more comparison functions to one or more objects of interest identified in each image in the pair of images to generate a respective similarity score for each pair of images.

17. The computer-readable medium of claim 15, the operations further comprising:

for each feature associated with a first image:

using, by the one or more server computers, one or more of the comparison functions to evaluate the feature of the first image against a corresponding feature of each respective image in the set of images to generate a similarity score corresponding to each feature pair, wherein each similarity score is a measure of the extent that the feature of the first image corresponds to another feature in a second image of each respective image pair; and determining, by the one or more server computers, whether each similarity score exceeds a predetermined similarity score threshold;

generating, by the one or more server computers, a cumulative similarity score by summing each of the similarity scores that exceed the predetermined similarity score threshold; and associating, by the one or more server computers, the cumulative similarity score with the first image.

18. The computer readable medium of claim 15, the operations further comprising:

adjusting by the one or more server computers, the transitional probability associated with a first image of a pair of images based on a query independent quality of the first image.

19. The computer readable medium of claim 15, the operations further comprising:

adjusting, by the one or more server computers, the transitional probability associated with a first image of a pair of images based on a determination that a first URL of a webpage that includes the first image is related to a second URL of a webpage that includes the second image.

20. The computer-readable medium of claim 15, wherein the one or more objects of interest are identified based on a variation in color between two or more portions of an image in the pair of images.

* * * * *